US012388209B2

(12) United States Patent
Huo et al.

(10) Patent No.: US 12,388,209 B2
(45) Date of Patent: Aug. 12, 2025

(54) TERMINAL, MOLDING METHOD AND ELECTRICAL CONNECTOR

(71) Applicant: Heshan Deren Electronic Technology Co., Ltd., Guangdong (CN)

(72) Inventors: Zhudong Huo, Guangdong (CN); Tongdao Xu, Guangdong (CN)

(73) Assignee: Heshan Deren Electronic Technology Co., Ltd., Guangdong (CN)

( * ) Notice: Subject to any disclaimer, the term of this patent is extended or adjusted under 35 U.S.C. 154(b) by 0 days.

(21) Appl. No.: 17/922,600

(22) PCT Filed: Dec. 15, 2021

(86) PCT No.: PCT/CN2021/138403
§ 371 (c)(1),
(2) Date: Nov. 1, 2022

(87) PCT Pub. No.: WO2023/097790
PCT Pub. Date: Jun. 8, 2023

(65) Prior Publication Data

US 2024/0222895 A1 Jul. 4, 2024

(30) Foreign Application Priority Data

Dec. 2, 2021 (CN) ........................ 202111461557.1

(51) Int. Cl.
*H01R 13/02* (2006.01)
*H01R 12/71* (2011.01)
(Continued)

(52) U.S. Cl.
CPC ........... *H01R 13/02* (2013.01); *H01R 12/716* (2013.01); *H01R 13/405* (2013.01); *H01R 43/16* (2013.01)

(58) Field of Classification Search
CPC .... H01R 13/02; H01R 13/405; H01R 12/716; H01R 43/16
(Continued)

(56) References Cited

U.S. PATENT DOCUMENTS 11,196,197 B1 * 12/2021 Wen ........................ H01R 12/57
2018/0331441 A1 * 11/2018 Huang ............... H01R 13/6461
(Continued)

FOREIGN PATENT DOCUMENTS

CN 207282768 U * 4/2018
CN 108281820 A * 7/2018 ............. H01R 12/52
(Continued)

*Primary Examiner* — Peter G Leigh

(57) ABSTRACT

The present application embodiments thereof provide a terminal, a molding method and an electrical connector. The terminal comprises a base, an elastic arm, a contact part and a connecting part, wherein the elastic arm is formed by obliquely extending upward from the base and toward one side in the thickness direction of the base, the elastic arm is opened with a limiting hole penetrating along the thickness direction thereof, and the limiting hole extending to the top surface of the base to divide the bottom of the elastic arm into two sub-arms spaced apart from each other, the top surface of the elastic arm and the side wall of the limiting hole adjacent to the top surface are provided as cambered surfaces which are convex in the upward direction, and two ends of the cambered surfaces along the circumferential direction are connected with the two sub-arms respectively.

11 Claims, 7 Drawing Sheets

(51) Int. Cl.
*H01R 13/405* (2006.01)
*H01R 43/16* (2006.01)

(58) Field of Classification Search
USPC .......................................................... 439/660
See application file for complete search history.

(56) References Cited

U.S. PATENT DOCUMENTS

| | | | | |
|---|---|---|---|---|
| 2018/0331442 | A1* | 11/2018 | Huang | H01R 12/585 |
| 2019/0173206 | A1* | 6/2019 | Ju | H01R 13/2442 |
| 2019/0173207 | A1* | 6/2019 | Ju | H01R 12/714 |
| 2019/0245289 | A1 | 8/2019 | Wu et al. | |
| 2019/0280414 | A1* | 9/2019 | Huang | H01R 12/707 |

FOREIGN PATENT DOCUMENTS

| | | | | | |
|---|---|---|---|---|---|
| CN | 108321572 | A | * | 7/2018 | H01R 12/716 |
| CN | 108448284 | A | | 8/2018 | |
| CN | 109659723 | A | * | 4/2019 | H01R 12/714 |
| CN | 109687186 | A | * | 4/2019 | H01R 12/714 |
| CN | 109818174 | A | * | 5/2019 | H01R 12/712 |
| CN | 111244655 | A | * | 6/2020 | H01R 12/714 |
| CN | 108258467 | B | * | 8/2020 | H01R 12/70 |
| CN | 111987503 | A | * | 11/2020 | H01R 12/714 |
| CN | 213043077 | U | * | 4/2021 | |
| CN | 213484025 | U | * | 6/2021 | |

* cited by examiner

TERMINAL, MOLDING METHOD AND ELECTRICAL CONNECTOR

CROSS-REFERENCE TO RELATED APPLICATION

The present application claims priority to Chinese Patent Application No. 2021114615571, filed with the Chinese Patent Office on Dec. 2, 2021, titled "A TERMINAL, MOLDING METHOD AND ELECTRICAL CONNECTOR", the entire contents of which are incorporated herein by reference.

TECHNICAL FIELD

The present application relates to an electrical connector, and in particular, relates to a terminal, a molding method and an electrical connector.

BACKGROUND

At present, terminals assembled in electrical connectors generally have an elastic arm extending out of the plastic structure. In order to make the elastic arm have good elastic performance, the elastic arm is designed to be relatively long, and the part of the elastic arm extending out of the plastic structure is elastically deformable. Due to the elongated structure of the elastic arm itself, the inductive reactance thereof is too large so that the impedance of the elastic arm is higher and the transmission impedance of high-frequency signals becomes larger. In addition, when the elastic arms of two adjacent terminals are crimped by the chip module, they are likely to contact with each other and cause short circuit.

SUMMARY

A technical problem mainly solved by embodiments of the present application is to provide a terminal, a molding method and an electrical connector, which have small inductive reactance and low impedance, enhance the transmission effect of high-frequency signals, reduce the shaking of terminals, and avoid short circuit caused by mutual contact of terminals.

In order to solve the above technical problem, a technical solution adopted by embodiments of the present application is to provide a terminal for being accommodated in an insulating body of an electrical connector, wherein the terminal comprises a base, an elastic arm, a contact part and a connecting part, the base is defined with a length direction, a width direction and a thickness direction which are perpendicular to each other, and the length direction is parallel to the up-down direction; the elastic arm is formed by obliquely extending upward from the base and toward one side in the thickness direction of the base, the elastic arm is opened with a limiting hole penetrating along the thickness direction thereof, and the limiting hole extending to the top surface of the base to divide the bottom of the elastic arm into two sub-arms spaced apart from each other, and the top surface of the elastic arm and the side wall of the limiting hole adjacent to the top surface are provided as cambered surfaces which are convex in the upward direction, and two ends of the cambered surfaces along the circumferential direction are connected with the two sub-arms respectively; the contact part is formed by extending upward from the elastic arm, the contact part is configured to electrically connect with a chip module; the connecting part is formed by extending downward from the base, the connecting part is used for welding with a circuit board, and the interval between the two sub-arms is larger than the width of the contact part.

Preferably, the connecting part comprises a welding section and a bent section connecting the welding section with the base.

Preferably, the welding section protrudes from the surface of the base towards one side of the thickness direction of the base, and the bent section protrudes from the surface of the base towards the other side of the thickness direction of the base.

Preferably, the bottom of the base is opened with a rectangular notch, and the bent section is connected to the bottom of the notch.

Preferably, one side of the base in the width direction is provided with a bent stopper close to the bottom surface of the base, and the bent stopper is bent toward the side where the elastic arm bends.

Preferably, the interval between the two sub-arms is greater than the width of the contact part.

Preferably, the tip of the contact part is bent toward the bottom of the base, and the tail of the contact part is lower than the highest point of the contact part in the height direction.

In order to solve the above technical problems, another technical solution adopted by the embodiments of the present application is to provide an electrical connector which comprises an insulating body and the terminal as described above, wherein the insulating body is provided with a plurality of accommodating grooves penetrating in the up-down direction, wherein the plurality of accommodating grooves are arranged on the insulating body in a plurality of rows, and one side of the top of the accommodating groove is provided with a limiting post; there are a plurality of the terminals, the plurality of terminals are arranged on the insulating body in a plurality of rows, and the limiting holes of the terminals are matched with the limiting posts.

Preferably, one side of the base along the width direction is provided with a positioning inclined plane, and a fitting inclined plane is arranged in the accommodating groove, and the fitting inclined plane is used for abutting against the positioning inclined plane.

Preferably, the accommodating grooves located in the same row are arranged at equal intervals, and the accommodating grooves located in two adjacent rows are arranged in a staggered manner.

In order to solve the above technical problems, yet another technical solution adopted by the embodiments of the present application is to provide a molding method for molding the terminal as described above, and the molding method comprises the following steps: punching a plate to obtain blanks; bending a bent stopper part of the blank at least once at a preset angle; bending a connecting part and a contact part of the blank; punching a base part of the blank; bending an elastic arm part of the blank; adjusting the elastic arm part.

The terminal, molding method and the electrical connector according to the embodiments of the present application differ from the situation of the related art in that: by providing the elastic arm with bifurcation at the bottom, the width of the elastic arm can be increased to improve the original elongated structure while ensuring the elastic performance, thereby reducing the inductive reactance, reducing the impedance of the elastic arm, and enhancing the transmission effect of high-frequency signals of the electrical connector. The top of the elastic arm is "C"-shaped, which makes the cross section of the signal transmission path change evenly, improves the smooth continuity of the overall high-frequency characteristic impedance of the terminal, reduces the fluctuation amplitude of the high-frequency characteristic impedance and improves the high-frequency performance. Furthermore, the limiting hole can be provided to match with the limiting post arranged on the insulating body, thereby reducing the shaking of the elastic arm in the direction parallel to the upper surface of the insulating body during installation or use, and avoiding the short circuit caused by the mutual contact of adjacent terminals. In addition, the two sub-arms spaced apart provide elastic force for the elastic arm at the same time so that the anti-bending performance of the elastic arm can be enhanced in the spacing direction of the sub-arms and the shaking of the elastic arm along the direction can be reduced.

BRIEF DESCRIPTION OF THE DRAWINGS

One or more embodiments are illustrated by pictures in corresponding attached drawings, and this does not constitute limitation on the embodiments. Elements with the same reference numerals in the attached drawings are shown as similar elements, and the pictures in the attached drawings do not constitute scale limitation unless otherwise stated particularly.

DETAILED DESCRIPTION

In order to make objectives, technical solutions and advantages of the present application clearer, the present application will be further described in detail hereinafter with reference to attached drawings and embodiments. It shall be appreciated that, the specific embodiments described herein are only used to explain the present application, and are not used to limit the present application.

It shall be noted that, all features in the embodiments of the present application may be combined with each other without conflict, and all the combinations are within the scope claimed in the present application. In addition, although functional module division is made in the schematic diagrams of the device and logical sequences are shown in the flowchart diagrams, in some cases, the steps shown or described can be executed with module division and sequences different from those in the schematic diagrams of the device and the flowchart diagrams.

Unless otherwise defined, all technical and scientific terms used in this specification have the same meanings as commonly understood by those skilled in the art of the present application. The terms used in the specification of the present application are only for the purpose of describing specific embodiments, and are not intended to limit the present application. The term "and/or" used in this specification comprises any and all combinations of one or more associated items listed.

Figure 1:
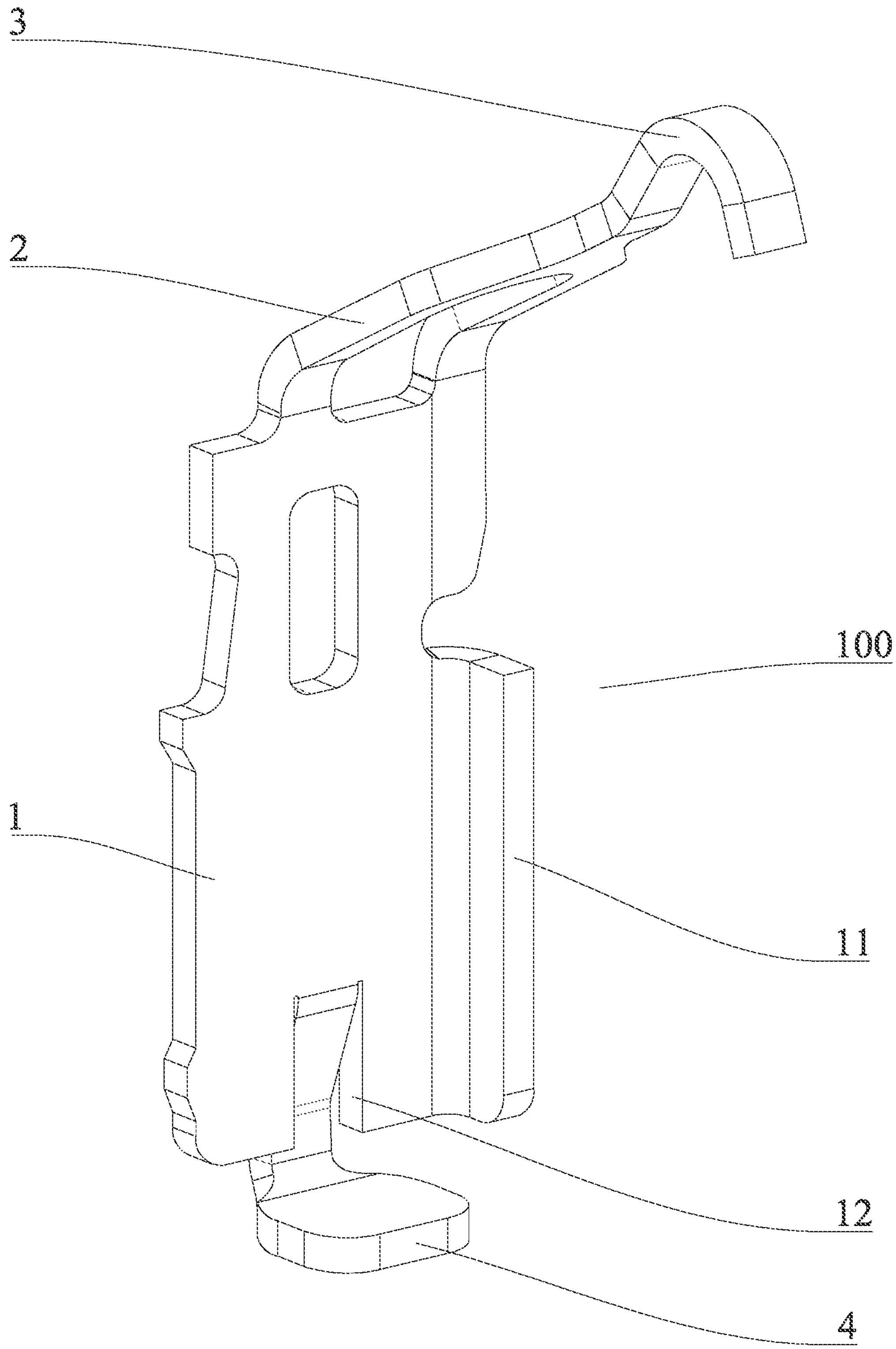
FIG. 1 is a schematic structural diagram of a terminal according to an embodiment of the present application.
Figure 2:
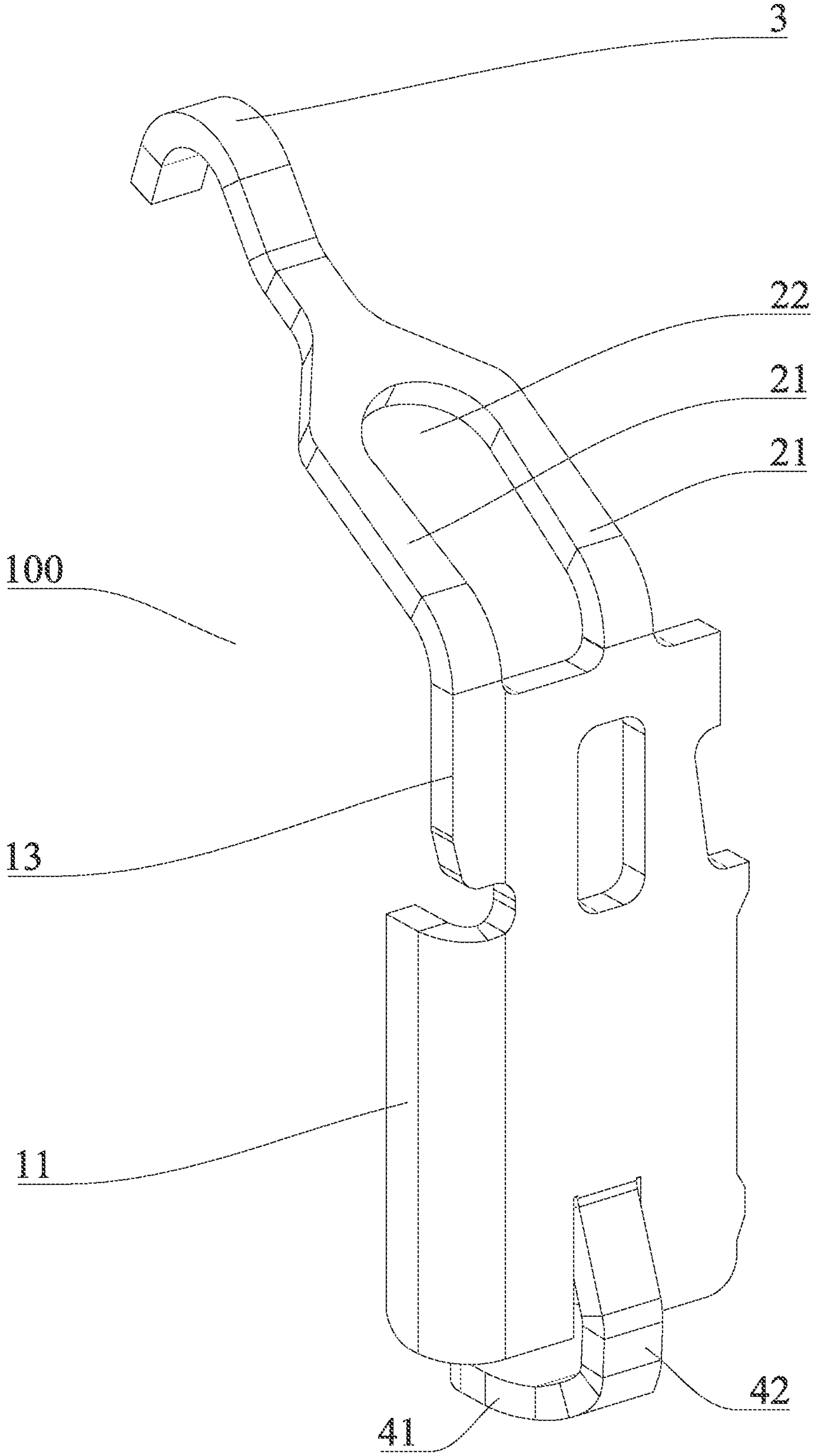
FIG. 2 is a schematic structural diagram of the terminal according to the embodiment of the present application from another perspective.

Referring to FIG. 1 and FIG. 2, a terminal 100 according to an embodiment of the present application is configured to be accommodated in an insulating body 200 of an electrical connector, and the terminal 100 comprises a base 1, an elastic arm 2, a contact part 3 and a connecting part 4. The base 1 is used for holding the terminal 100, the contact part 3 is used for electrically connecting with a chip module, the elastic arm 2 is used for providing elastic force to ensure that the contact part 3 is in close contact with the chip module, and the connecting part 4 is used for welding with a circuit board so as to electrically connecting the chip module with the circuit board indirectly.

The base 1 described above is defined with a length direction, a width direction and a thickness direction perpendicular to each other, and the length direction is parallel to the up-down direction. One side of the base 1 in the width direction is provided with a bent stopper 11 close to the bottom surface of the base 1, and the bent stopper 11 is bent toward the side where the elastic arm 2 bends. The bent stopper 11 is used for contacting with the insulating body 200, increasing the contact area between the terminal 100 and the insulating body 200 and improving the stability for fixing the terminal 100. It can also enhance the capacitance effect between the bent stopper 11 and the base 1, improve the impedance of the terminal 100, and enhance the coupling effect between adjacent terminals 100, thereby adjusting and control the impedance of the whole electrical connector 300 and improving the high-frequency performance.

In some embodiments, the bottom of the base 1 is opened with a rectangular notch 12. By opening the notch 12, the length of the connecting part 4 may be increased, the elasticity of the connecting part 4 may be increased, and the risk of being separated from the solder ball for the connecting part 4 may be reduced.

The elastic arm 2 described above is formed by obliquely extending upward from the base 1 and toward one side in the thickness direction of the base 1, the elastic arm 2 is opened with a limiting hole 22 penetrating along the thickness direction thereof, and the limiting hole 22 extends to the top surface of the base 1 to divide the bottom of the elastic arm 2 into two sub-arms 21 spaced apart from each other, and the top surface of the elastic arm 2 and the side wall of the limiting hole 22 adjacent to the top surface are provided as cambered surfaces which are convex in the upward direction, and two ends of the cambered surface along the circumferential direction are connected with the two sub-arms 21 respectively so that the top of the elastic arm 2 is "C"-shaped. By providing the elastic arm 2 with bifurcation at the bottom, the interval between the two sub-arms 21 can be increased, i.e., the width of the elastic arm 2 can be increased to improve the original elongated structure while ensuring the elastic performance, thereby reducing the inductive reactance, reducing the impedance of the elastic arm 2, and enhancing the transmission effect of high-frequency signals of the electrical connector 300. The top of the elastic arm is "C"-shaped, which makes the cross section of the signal transmission path change evenly, improves the smooth continuity of the overall high-frequency characteristic impedance of the terminal, reduces the fluctuation amplitude of the high-frequency characteristic impedance and improves the high-frequency performance.

Particularly, the interval between the two sub-arms 21 is larger than the width of the contact part 3. In the spacing direction of the sub-arms 21, the anti-bending performance of the elastic arms 2 can be enhanced, the shaking of the elastic arms 2 in this direction can be reduced, and short circuit caused by the mutual contact of adjacent terminals 100 can be avoided. It is also possible to increase the width of the elastic arms 2 by adjusting the width of the limiting hole 22, shorten the distance between the elastic arms 2 of the adjacent terminals 100 while ensuring the mechanical properties and enhance the coupling effect between the adjacent terminals 100, thereby reducing the impedance of the whole electrical connector 300.

Particularly, the arrangement of the limiting hole 22 can be used to stabilize the elastic arm 2 and reduce the shaking of the elastic arm 2 in the direction parallel to the upper surface of the insulating body 200, thereby avoiding the short circuit caused by the mutual contact between adjacent terminals 100.

Particularly, the limiting hole 22 between the two sub-arms 21 described above can directly expose the top of the base 1 so that it is convenient for the top to serve as a point of force application for mounting the terminal 100.

The contact part 3 described above is formed by extending upward from the elastic arm 2, the tip of the contact part 3 is bent toward the bottom of the base 1, and the tail of the contact part 3 is lower than the highest point of the contact part 3 in the height direction. The bending at the tip of the contact part 3 can prevent the chip module from being scratched by the sharp tip of the contact part 3. Moreover, the curved surface formed by bending is smooth, which reduces the resistance between the contact part 3 and the chip module. In this way, the installation of the chip module is smoother, and strenuous installation due to excessive resistance and even the damage of the contact part 3 can be avoided.

The connecting part 4 described above is formed by extending downward from the base 1, and the connecting part 4 comprises a welding section 41 and a bent section 42 connecting the welding section 41 with the base 1. The welding section 41 is used for welding with the circuit board, and the bent section 42 is used for elastically connecting the welding section 41, thereby reducing the stress between the welding section 41 and the circuit board and reducing the risk of being separated from the solder ball for the welding section 41.

In some embodiments, the welding section 41 protrudes from the surface of the base 1 towards one side of the thickness direction of the base 1, and the bent section 42 protrudes from the surface of the base 1 towards the other side of the thickness direction of the base 1. The welding section 41 and the bent section 42 respectively protrude from both sides of the base 1, so that the stress imposed on the bent section 42 is along the length direction of the base 1, thereby avoiding extra stress, reducing stress damage and prolonging service life.

Figure 3:
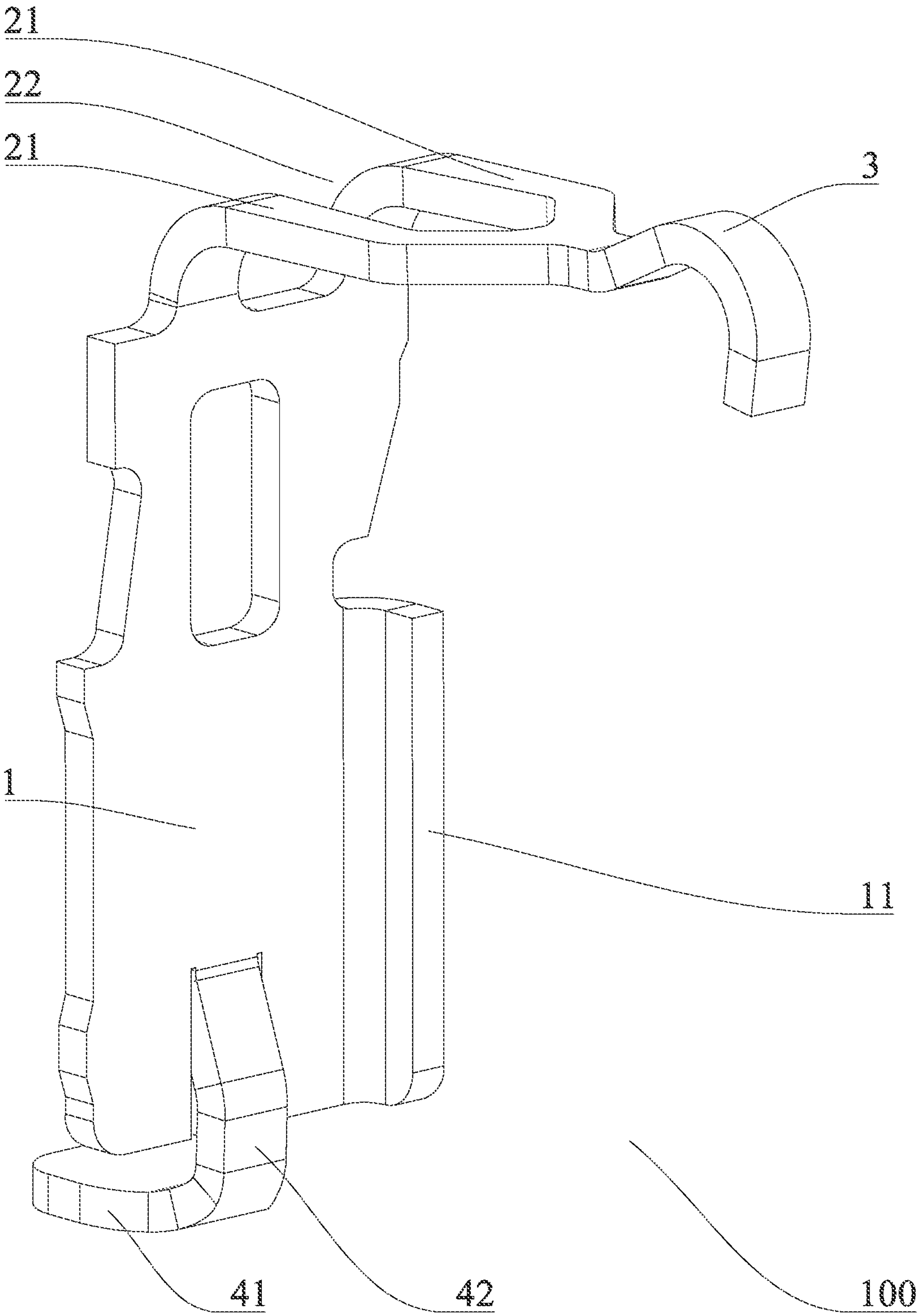
FIG. 3 is a schematic structural diagram of a terminal according to another embodiment of the present application.

Referring to FIG. 1 and FIG. 3, the bent section 42 of the terminal 100 may be bent in two directions. Since the position of the solder joint on the circuit board is fixed, the position of the contact part 3 relative to the insulating body 200 needs to be fixed, and thus the positions of the solder joints of the welding sections 41 of the two terminals 100 are the same. However, the position of the base 1 is changed relative to the circuit board, which results in different lengths of the elastic arms 2 of the two terminals 100. The terminal 100, for which the welding section 41 and the elastic arm 2 are arranged at the same side of the base 1, features good strength and toughness and long signal transmission length. The terminal 100, for which the welding section 41 and the elastic arms 2 are respectively arranged at both sides of the base 1, features poor strength and toughness, short signal transmission length, low loss and good high-frequency performance.

In some embodiments, the bent section 42 is connected to the bottom of the notch 12. In this way, the length of the bent section 42 is prolonged, the elasticity of the bent section 42 is increased, and the risk of being separated from the solder ball is reduced for the connecting part 4.

Figure 4:
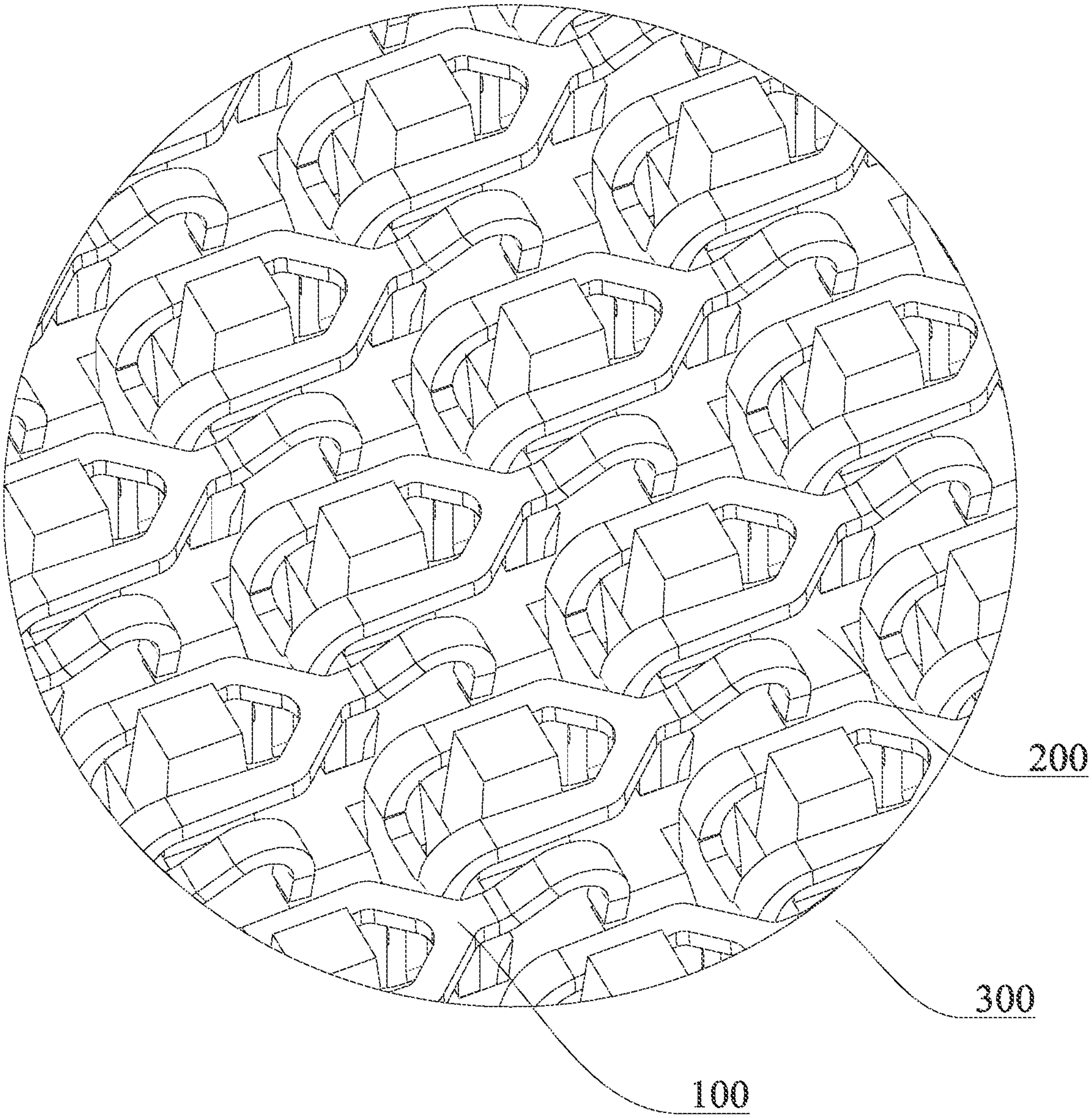
FIG. 4 is a partial schematic structural diagram of an electrical connector according to an embodiment of the present application.
Figure 5:
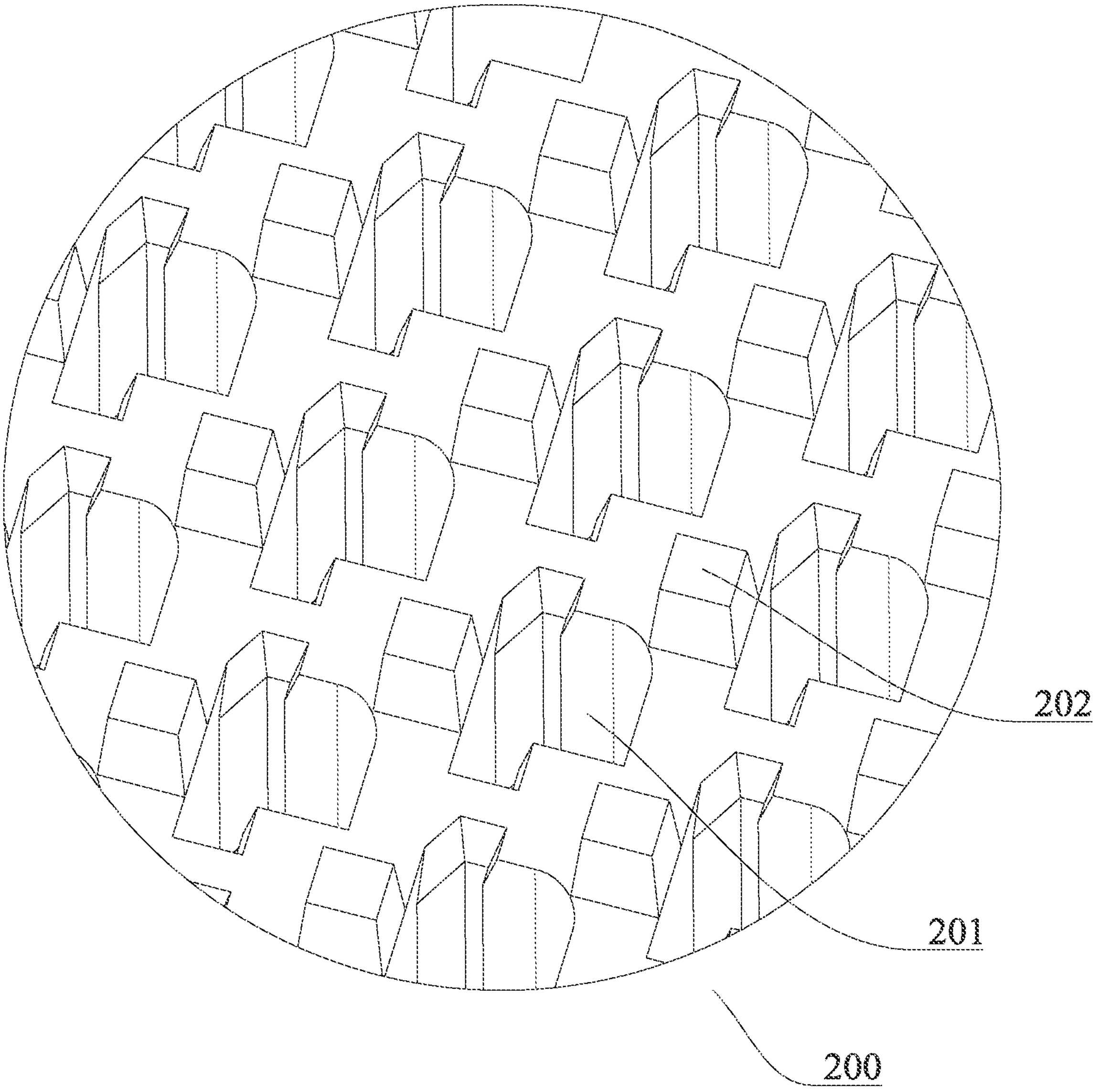
FIG. 5 is a partial schematic structural diagram of an insulating body according to an embodiment of the present application.
Figure 6:
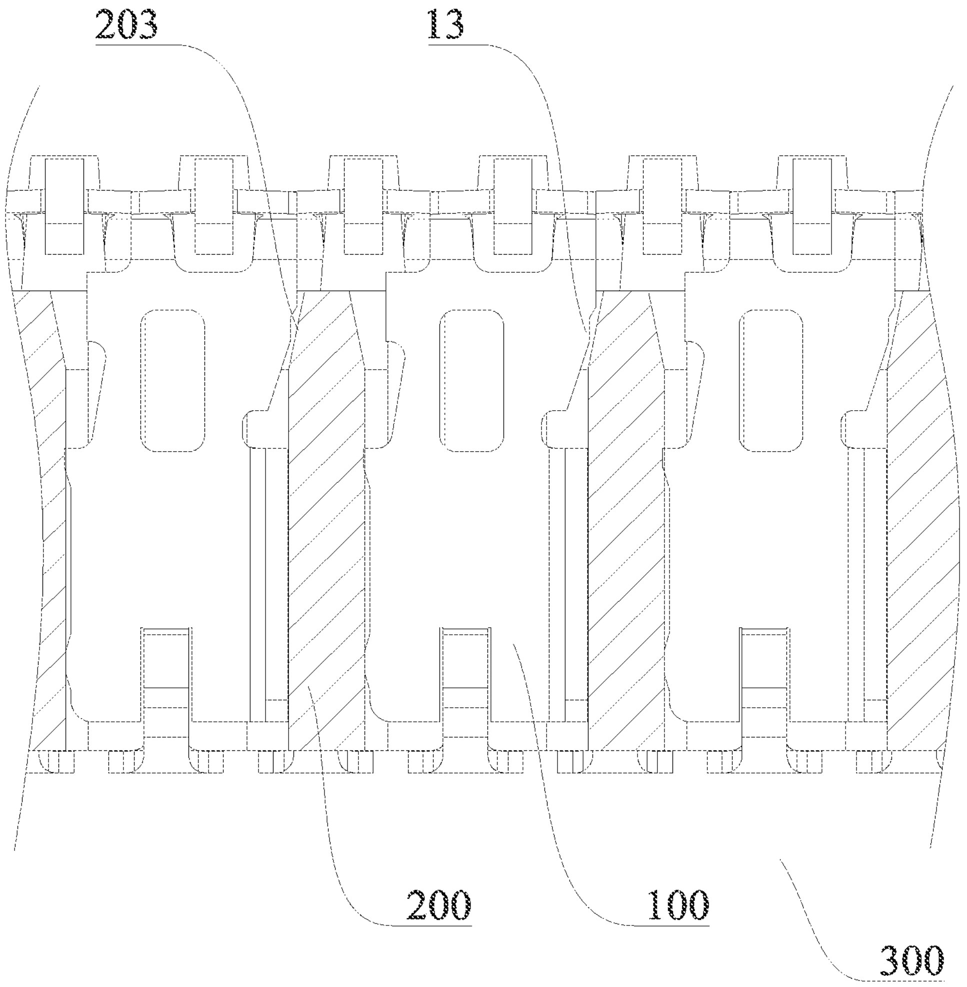
FIG. 6 is a partial cross-sectional view of an electrical connector according to an embodiment of the present application.

Referring to FIG. 4, the electrical connector 300 according to the embodiment of the present application comprises an insulating body 200 and the terminal 100 as described above, wherein the insulating body 200 has a plurality of accommodating grooves 201 penetrating in the up-down direction, the plurality of accommodating grooves 201 are arranged on the insulating body 200 in a plurality of rows. There are a plurality of terminals 100, and the plurality of terminals 100 are arranged on the insulating body 200 in a plurality of rows. The terminals 100 are accommodated in the accommodating grooves 201 so that they are arranged neatly and held stably and are convenient for packaging and transportation.

For the insulating body 200 described above, one side of the top of the accommodating groove 201 is provided with a limiting post 202, and the limiting hole 22 of the terminal 100 is matched with the limiting post 202, so as to stabilize the elastic arm 2, reduce the shaking of the elastic arm 2 in the direction parallel to the upper surface of the insulating body 200, and prevent short circuit caused by the mutual contact between adjacent terminals 100.

In one embodiment, the accommodating grooves 201 located in the same row are arranged at equal intervals, and the accommodating grooves 201 located in two adjacent rows are arranged in a staggered manner. The staggered arrangement of the accommodating grooves 201 can prevent mutual interference of the terminals 100 in two adjacent rows, and can also make full use of the space of the insulating body 200, thereby reducing the size of the insulating body 200 or increasing the size of the terminals 100.

For the terminal 100 described above, one side of the base 1 along the width direction is provided with a positioning inclined plane 13, a fitting inclined plane 203 is arranged in the accommodating groove 201, and the fitting inclined plane 203 is used for abutting against the positioning inclined plane 13. Since the positioning inclined plane 13 of the terminal 100 abuts against the fitting inclined plane 203 of the accommodating groove 201, the position of the terminal 100 in the accommodating groove 201 along the length direction can be positioned, and the assembly accuracy can be improved.

For the terminal 100 and the electrical connector 300 of the present application, by providing the elastic arm 2 with bifurcation at the bottom, the width of the elastic arm 2 can be increased to improve the original elongated structure while ensuring the elastic performance, thereby reducing the inductive reactance, reducing the impedance of the elastic arm 2, and enhancing the transmission effect of high-frequency signals of the electrical connector 300. The top of the elastic arm is "C"-shaped, which makes the cross section of the signal transmission path change evenly, improves the smooth continuity of the overall high-frequency characteristic impedance of the terminal, reduces the fluctuation amplitude of the high-frequency characteristic impedance and improves the high-frequency performance. Furthermore, the limiting hole 22 can be provided to match with the limiting post 202, thereby stabilizing the elastic arm 2, reducing the shaking of the elastic arm 2 in the direction parallel to the upper surface of the insulating body 200, and avoiding the short circuit caused by the mutual contact of adjacent terminals 100. In addition, the two sub-arms 21 spaced apart provide elastic force for the elastic arm 2 at the same time so that the anti-bending performance of the elastic arm 2 can be enhanced in the spacing direction of the sub-arms 21 and the shaking of the elastic arm 2 along the direction can be reduced.

Figure 7:
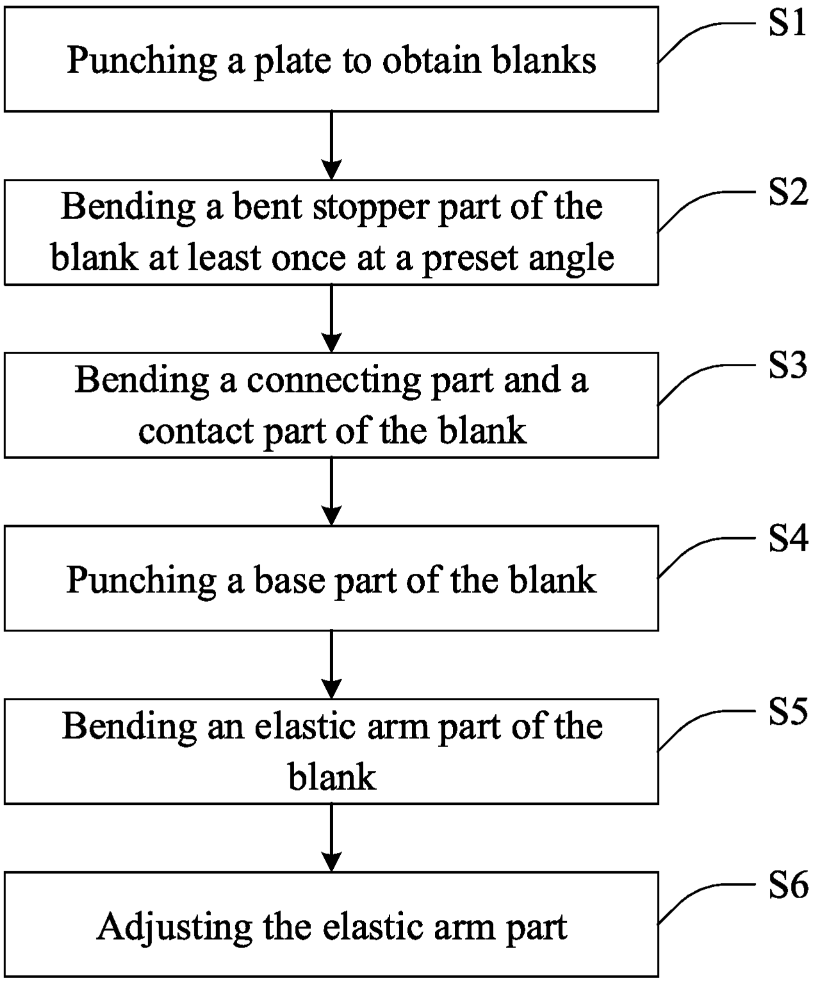
FIG. 7 is a flowchart diagram of a molding method according to an embodiment of the present application.

As shown in FIG. 7, the molding method according to the embodiment of the present application is used to mold the terminal 100 as described above, and it comprises the following steps:

S1: punching a plate to obtain blanks.

Multiple sheet-like blanks were obtained by punching a plate with thickness of 0.07 mm, wherein a copper plate is generally adopted as the plate. A base part, an elastic arm part, a contact part and a connecting part, which respectively correspond to the base 1, the elastic arm 2, the contact part 3 and the connecting part 4 of the terminal 100, are formed by punching on the blanks, and the elastic arm part is provided with a limiting hole part.

S2: bending a bent stopper part of the blank at least once at a preset angle.

The bent stopper part is bent to be perpendicular to the base part, wherein the bent stopper part may be directly molded through being bent by 90 degrees at one time, or the bent stopper part may be molded through multiple times of bending. For example, the multiple times of bending may include 45-degree bending for two times, 30-degree bending for three times, or 40-degree bending for one time followed by 50-degree bending for one time.

It is relatively difficult to bend the bent stopper part by 90 degrees at one time, and the molding effect is poor. As compared to bending for one time, multiple times of bending can be completed simply by performing multiple times of stamping, and the bending is carried out by pressing and exerting force on both sides, so that the bending effect is good and the surface of the bent stopper part will not be scratched.

S3: bending a connecting part and a contact part of the blank.

The connecting part on the blank is bent by nearly 90 degrees, e.g., 87 degrees, so as to facilitate further bending and make the connecting part perpendicular to the base part. The contact part on the blank is stamped and bent to form an arc-shaped convex structure, and the outer arc side of the convex structure is used for contacting with the conductive part on the chip module, so that the chip module can be prevented from being scratched when it is installed.

S4: punching a base part of the blank.

One side of the base part connected with the connecting part is punched so as to obtain a strip-shaped bent part which connects the connecting part and the base part. Moreover, in the punching process, the bent part is stamped to bend it into a "C" shape, and the connecting part is also perpendicular to the base part.

S5: bending an elastic arm part of the blank.

One end of the elastic arm part connected with the base part is bent by 60 degrees, so that the angle included between the elastic arm part and the base part is 120 degrees. Because the elastic arm part has great elasticity, it will rebound greatly after being bent. Therefore, it is necessary to bend the elastic arm part excessively in order to make the angle after rebounding approach 120 degrees.

S6: adjusting the elastic arm part.

Due to the large elasticity of the elastic arm part, it is still difficult to reach the preset angle after excessive bending, so further adjustment is required. The elastic arm part may be placed into a mold to be heated and molded quickly, or it can be bent excessively again according to its deviation from the preset angle so as to correct the deviation.

The molding method of the terminal 100 according to the embodiment of the present application punches the plate to quickly obtain the desired blanks by fully taking into account the structure of the terminal 100 of the embodiment of the present application. Parts at both ends of the blank are bent and punched first, so that the blank is always in an approximate plane state before the last bending step and it is convenient for processing. Finally, the middle part of the blank is bent and adjusted, which is unlikely to affect the previous bending step; the steps are simple and reasonable, and the molding effect of the terminal 100 is good.

Finally, it shall be noted that, the above embodiments are only used to illustrate the technical solutions of the present application, and are not intended to limit the present application. Under the idea of the present application, technical features in the above embodiments or different embodiments may also be combined, the steps may be implemented in any order, and many other variations in different aspects of the present application as described above are possible, and these variations are not provided in details for conciseness. Although the present application has been described in detail with reference to the foregoing embodiments, those of ordinary skill in the art shall appreciate that, the technical solutions described in the foregoing embodiments may still be modified or some of the technical features may be equivalently replaced. These modifications or replacements do not make the essence of the corresponding technical solutions deviate from the scope of the technical solutions of various embodiment of the present application.

What is claimed is:

1. A terminal for being accommodated in an insulating body electrical connector, being characterized in that, comprising:

a base, being defined with a length direction, a width direction and a thickness direction which are perpendicular to each other, and the length direction being parallel to the up-down direction;

an elastic arm, being formed by obliquely extending upward from the base and toward one side in the thickness direction of the base, the elastic arm being opened with a limiting hole penetrating along the thickness direction thereof, and the limiting hole extending to the top surface of the base to divide the bottom of the elastic arm into two sub-arms spaced apart from each other, and the top surface of the elastic arm and the side wall of the limiting hole adjacent to the top surface are provided as cambered surfaces which are convex in the upward direction, and two ends of the cambered surface along the circumferential direction being connected with the two sub-arms respectively;

a contact part, being formed by extending upward from the elastic arm, the contact part being configured to electrically connect with a chip module;

a connecting part, being formed by extending downward from the base, the connecting part being used for welding with a circuit board;

wherein the interval between the two sub-arms is larger than the width of the contact part;

the connecting part comprises a welding section and a bent section connecting the welding section with the base; and the bottom of the base is opened with a rectangular notch, and the bent section is connected to the bottom of the notch.

2. The terminal according to claim 1, being characterized in that, the welding section protrudes from the surface of the base towards one side of the thickness direction of the base, and the bent section protrudes from the surface of the base towards the other side of the thickness direction of the base.

3. The terminal according to claim 2, wherein both ends of the bent section are in the plane where the base is located.

4. The terminal according to claim 1, being characterized in that, one side of the base in the width direction is provided with a bent stopper close to the bottom surface of the base, and the bent stopper is bent toward the side where the elastic arm bends.

5. The terminal according to claim 1, being characterized in that, the tip of the contact part is bent toward the bottom of the base, and the tail of the contact part is lower than the highest point of the contact part in the height direction.

6. An electrical connector, being characterized in that, comprising:

an insulating body, being provided with a plurality of accommodating grooves penetrating in the up-down direction, wherein the plurality of accommodating grooves are arranged on the insulating body in a plurality of rows, and one side of the top of the accommodating groove is provided with a limiting post;

a plurality of the terminals according to claim 1, wherein the plurality of the terminals are arranged on the insulating body in a plurality of rows, and the limiting holes of the terminals are matched with the limiting posts.

7. The electrical connector according to claim 6, being characterized in that, one side of the base along the width direction is provided with a positioning inclined plane, and a fitting inclined plane is arranged in the accommodating groove, and the fitting inclined plane is used for abutting against the positioning inclined plane.

8. The electrical connector according to claim 6, being characterized in that, the accommodating grooves located in the same row are arranged at equal intervals, and the accommodating grooves located in two adjacent rows are arranged in a staggered manner.

9. The terminal according to claim 1, wherein the top of the elastic arm is C-shaped.

10. The terminal according to claim 1, wherein the top of the base is exposed.

11. The terminal according to claim 1, wherein one side of the base along the width direction is provided with a positioning inclined plane.

* * * * *